（12）United States Patent
Monson et al.

(10) Patent No.: US 9,881,411 B2
(45) Date of Patent: Jan. 30, 2018

(54) PROFILING RAY TRACING RENDERERS

(71) Applicant: Imagination Technologies Limited, Kings Langley (GB)

(72) Inventors: Nur Monson, San Ramon, CA (US); James Alexander McCombe, San Francisco, CA (US); Sean Matthew Gies, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 66 days.

(21) Appl. No.: 14/852,863

(22) Filed: Sep. 14, 2015

(65) Prior Publication Data

US 2015/0379757 A1    Dec. 31, 2015

Related U.S. Application Data

(63) Continuation of application No. 13/670,444, filed on Nov. 6, 2012, now Pat. No. 9,235,921.
(Continued)

(51) Int. Cl.
| | |
|---|---|
| *G06T 15/06* | (2011.01) |
| *G06T 1/20* | (2006.01) |
| *G06T 1/60* | (2006.01) |
| *G06T 15/50* | (2011.01) |
| *G06F 11/34* | (2006.01) |

(52) U.S. Cl.
CPC .......... *G06T 15/06* (2013.01); *G06F 11/3452* (2013.01); *G06F 11/3466* (2013.01); *G06T 1/20* (2013.01); *G06T 1/60* (2013.01); *G06T 15/50* (2013.01); *G06F 11/3409* (2013.01); *G06F 2201/865* (2013.01)

(58) Field of Classification Search
None
See application file for complete search history.

(56) References Cited

U.S. PATENT DOCUMENTS

2007/0018980 A1* 1/2007 Berteig ................. G06T 17/005
345/426
2008/0259075 A1 10/2008 Fowler et al.

OTHER PUBLICATIONS

Levoy, "Efficient Ray Tracing of Volume Data," ACM Transactions on Graphics, vol. 9, No. 3, Jul. 1990, pp. 245-261.
(Continued)

*Primary Examiner* — Ryan D McCulley
(74) *Attorney, Agent, or Firm* — Vorys, Sater, Seymour and Pease LLP; Vincent M DeLuca

(57) ABSTRACT

A profiler for a ray tracing renderer interfaces with the renderer to collect rendering information, such as ray definition information, a pixel origin, objects hit, shader invocation, and related rays. In an interface, an artist views a simplified 3-D scene model and a rendered 2-D image. A pixel in the 2-D image is selectable; the profiler responds by populating the simplified 3-D scene with rays that contributed to that pixel. Rays can be displayed in the simplified 3-D scene to visually convey information about characteristics of each ray, such as whether the ray intersected an object, portions of the scene where it is occluded, and a direction. Statistics can be produced by the profiler that convey information such as relative computational complexity to render particular pixels. The profiler can step through multiple passes (e.g., multiple frames and passes of a multipass rendering), and the UI can allow pausing and stepping.

20 Claims, 13 Drawing Sheets

Related U.S. Application Data

(60) Provisional application No. 61/557,056, filed on Nov. 8, 2011.

(56) References Cited

OTHER PUBLICATIONS

Russell, "An Interactive Web-Based Ray Tracing Visualization Tool," Undergraduate Honors Program Senior Thesis, Department of Computer Science, University of Washington, 1999.

Goldman et al., "Three-Dimensional Computation Visualization for Computer Graphics Rendering Algorithms," Proceedings of the 27th SIGCSE Technical Symposium on Computer Science Education, 1996, pp. 358-362.

Briggs et al., "A Self-Visualizing Rendering Support Environment," Computers and Graphics, vol. 22, No. 4, 1998, pp. 547-555.

Fisher et al., "Ray Tracing Visualization Toolkit," High Performance Graphics, Aug. 2011.

Wald et al., "State of the Art in Interactive Ray Tracing," In State of the Art Reports, EUROGRAPHICS 2001, pp. 21-42 (2001).

Lauterbach, "Fast Hard and Soft Shadow Generation on Complex Models Using Selective Ray Tracing," Technical Report TR09-004, UNC Chapel Hill, Jan. 1, 2009.

\* cited by examiner

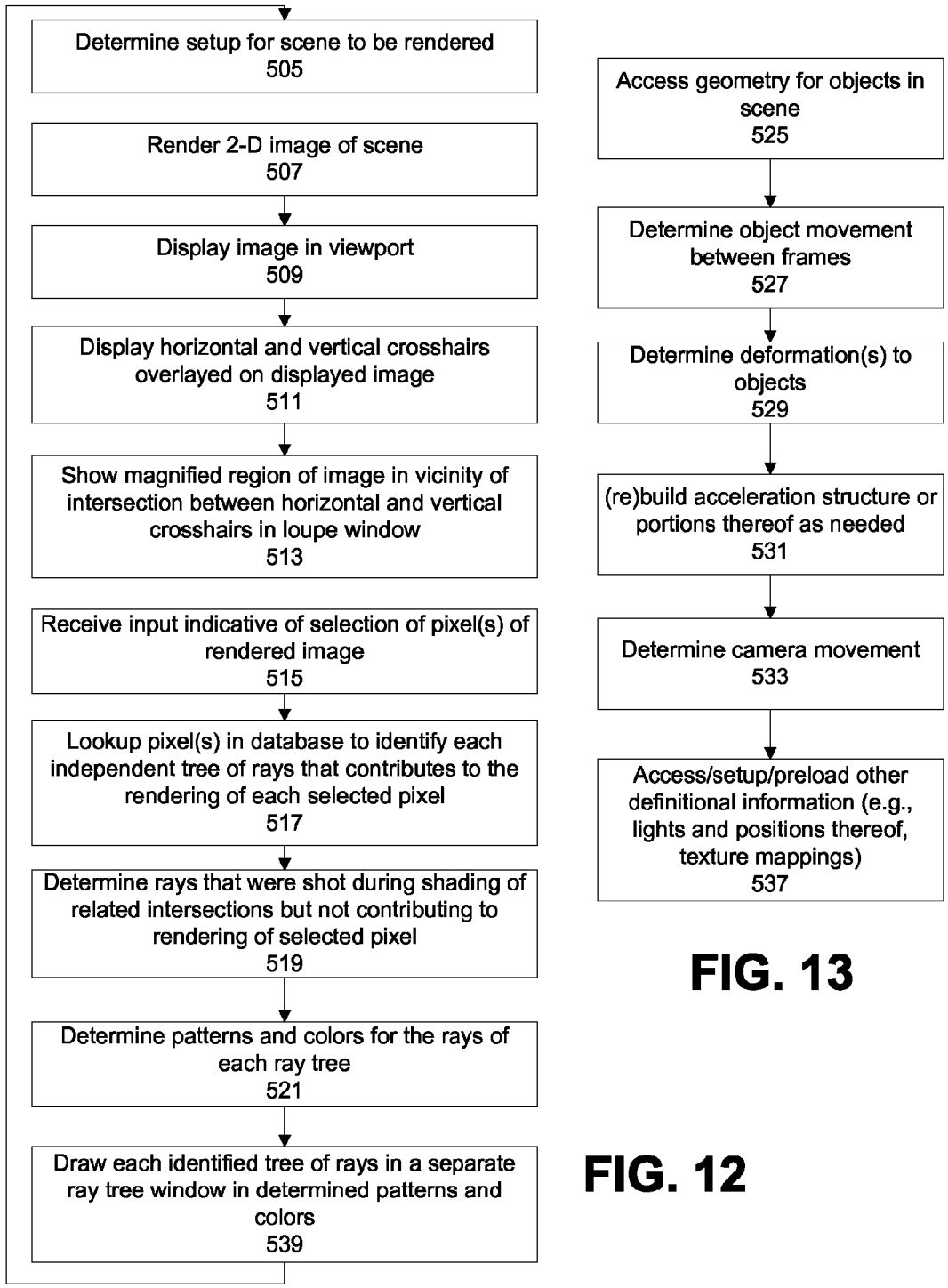

PROFILING RAY TRACING RENDERERS

CROSS REFERENCE TO RELATED APPLICATIONS

This application is a non-provisional application of U.S. Prov. App. No. 61/557,056, entitled "Systems and Methods for Profiling Ray Tracing Renderers", filed on Nov. 8, 2011, and which is incorporated by reference in its entirety herein.

BACKGROUND

Field

Rendering photo-realistic 2-D images from 3-D scene descriptions with ray tracing is well-known in the computer graphics arts. Ray tracing is known to produce photo-realistic images, including realistic shadow and lighting effects, because ray tracing can model the physical behavior of light interacting with elements of a scene. Ray tracing usually involves obtaining a scene description composed of geometric shapes, which describe surfaces of structures in the scene, and can be called primitives. A common primitive shape is a triangle. Objects can be composed of one or more such primitives. Objects can be composed of many thousands, or even millions of such primitives. Scenes typically contain many objects. Resolution of displays and the media to be displayed thereon continue to increase. Ray tracing requires repeating a few calculations many times with different data (e.g. intersection testing), as well as executing special purpose code ("shading") for identified ray intersections, in addition to other processing.

Rendering of complex 3-D scenes can involve many different objects defined by geometry, textures, procedural modifications, camera views, animation effects, and so on. All of these components to a successful rendering can also be of aberrant rendering outputs. Approaches to assisting graphics designers and developers in reaching desired results in ray tracing rendering therefor are desired.

SUMMARY

The following disclosure relates to profilers for ray tracing renderers (and to components thereof). A renderer can be composed of hardware configured by software, as well as hardware that can perform fixed-function tasks. Different renderers may have different physical implementations. A profiler according to the disclosure can interface with a renderer to access intermediate rendering data, and can use hooks that are provided through an application programming interface (API) in order to gather such data. The profiler also can inject data to the renderer using such API, in order to control the renderer through the profiler. The profiler provides a visual depiction of characteristics of rays that have been contributed to one or more pixels of a rendered image. In an implementation, the profiler displays a view that shows the 3-D scene from a selected perspective and overlays rays that were emitted during rendering of a particular pixel in that scene, so as to indicate attributes of the rays and how those rays contributed or did not contribute. A variety of statistics can be formulated using the gathered intermediate rendering data.

In an aspect, a machine-implemented method of characterizing constituent components of a ray tracing renderer comprises configuring a rendering system to generate a 2-D grid of pixels from a 3-D scene description. The configuring comprises accessing a 3-D scene description comprising geometry representative of objects in the 3-D scene, and shader modules determining how those objects are to interact with light energy in the 3-D scene in order to generate a 2-D grid of pixels from the 3-D scene viewed from a first perspective. The method includes determining a portion of the 2-D grid of pixels and causing the rendering system to generate color outputs for the determined portion of the 2-D grid. The method includes recording intermediate state of the rendering system during generation of the color outputs, which comprising definition information for rays emitted, respective definitional information comprising a path for the ray through the 3-D scene. The method provides for outputting a representation of the 3-D scene rendered from a second perspective, and respective representations of the rays emitted. Each ray representation comprises one or more visual characteristics determined according to a type of that ray, a result of intersection testing of that ray, and a relative spatial relationship of that ray with respect to the objects in the 3-D scene, as viewed from the second perspective.

In an aspect, a machine implemented method of assisting in the debug of ray tracing scene rendering programs comprising displaying a first window with a fully rendered 2-D image of a 3-D scene, the fully rendered 2-D image being representative of actual output produced by a scene rendering program; and generating statistics representative of computation performed during the rendering of the 2-D image, the statistics indicative of relative computation complexity to render the 2-D image, compared with other rendering passes in which a fully rendered 2-D image of the 3-D scene were produced.

A tangible machine readable medium storing machine executable instructions for performing a method, comprising: rendering, using ray tracing, a first framebuffer comprising color information for pixels in a viewport, the first framebuffer rendered from a 3-D scene description, comprising geometry defining objects in the scene, respective shader code modules defining how the objects are to interact with light impinging on a surface of that object, and one or more sources of light in the scene; generating a second framebuffer with entries corresponding to pixels in the viewport, the second framebuffer comprising color information for each entry of the second framebuffer, the color information for each entry in the second framebuffer determined according to a relative computational complexity (e.g., a number of rays that were used to render the pixel) in determining the color information for the pixel in the first framebuffer corresponding to that entry in the second framebuffer.

A machine implemented method of assisting in the debug of ray tracing scene rendering programs, comprising: generating a fully rendered 2-D image of a 3-D scene, the fully rendered 2-D image being representative of actual output produced by a scene rendering program in rendering the 3-D scene; and generating statistics representative of computation performed during the rendering of the 2-D image, the statistics indicative of relative computation complexity to render each of the pixels of the 2-D image.

A machine implemented method of assisting in the debug of ray tracing scene rendering programs, comprising: displaying a first window with a fully rendered 2-D image of a 3-D scene, the fully rendered 2-D image being representative of actual output produced by a scene rendering program; and stepping the scene rendering program through each pass of a multipass rendering, wherein the 3-D scene is updated according to outputs of a previous pass, and the displaying step is repeated according to the updated 3-D scene.

A machine implemented method of assisting in the debug of ray tracing scene rendering programs, comprising: accessing, from a tangible machine readable medium, data describing a ray tracing program to be executed, the data defining an ordered series of rendering passes to be taken in rendering a 2-D image from a 3-D scene description; receiving an indication to render a subsequent rendering pass of the ordered series of rendering passes; and responsively rendering the subsequent rendering pass, being one or more of a pass of a multipass rendering and a subsequent frame of a rendering.

A machine implemented method of assisting in the debug of ray tracing scene rendering programs, comprising: displaying a fully rendered 2-D image of a 3-D scene, the fully rendered 2-D image being representative of actual output produced by a scene rendering program; accepting an input indicative of selection of a pixel from the fully rendered 2-D image; defining a viewport according to the pixel selection; inputting the defined viewport as a definition of a 2-D image to render from the 3-D scene; capturing statistics during the rendering of the 2-D image according to the defined viewport, including information describing each ray generated by each portion of the scene rendering program during the rendering; and outputting the captured statistics.

A machine implemented method of assisting in the debug of ray tracing scene rendering programs, comprising: displaying a fully rendered 2-D image of a 3-D scene, the fully rendered 2-D image being representative of actual output produced by a scene rendering program; displaying a 2-D debug image of the 3-D scene, the 2-D debug image depicting objects and lights located in the 3-D scene, without shadow effects and texture mapping operations; displaying overlayed on the 2-D debug image of the 3-D scene, a tree of rays that contributed to a state of a selected pixel of the fully-rendered 2-D image of the 3-D scene; accepting an input indicative of selection of a ray from the displayed tree of rays; and responsive to the selection input, determining a portion of the scene rendering program responsible for emitting that ray, and displaying that portion of the scene rendering program in an editor.

In the above aspects, each may be implemented with features according to the following. A feature that provides for receiving an input indicating a pause in the stepping of the scene rendering program, generating a debug 2-D image with pixels corresponding to each pixel of the fully rendered 2-D image of the 3-D scene. A feature that provides for the color of each pixel of the 2-D debug image to be determined according to a measure of computation required to determine a final color of the corresponding pixel of the fully rendered 2-D image. The measure of computation may include counting a number of rays emitted during rendering of the corresponding pixel of the fully-rendered 2-D image. The measure of computation may comprise a ratio of rays that hit any scene object, or that missed all scene objects, with the number of rays emitted during rendering of the corresponding pixel. The measure of computation may comprise establishing averages for statistics concerning a count of a number of rays emitted during rendering of the corresponding pixel of the fully-rendered 2-D image. The measure of computation may include estimating time expended by a computation unit during rendering of the corresponding pixel of the fully-rendered 2-D image. The measure of computation may include counting a number of elements of geometry acceleration data that were intersection tested during intersection testing of the rays emitted during rendering of the corresponding pixel of the fully-rendered 2-D image.

Multiple measures of computation may be provided, such as a selection of the above-described measures. These measures can be presented with statistics comprising at least one of an average rays per pixel, individual counts of rays emitted to rendering at least a selected subset of the pixels, an amount of computation spent in executing shading code, and amount of intersection tests spent in testing an acceleration structure.

Thus, some aspects of this disclosure relate to systems and methods of profiling a ray tracing renderer and/or components thereof. Such profiling can include tools for visualizing trees of rays that contribute to a selected pixel in a rendering output. Other examples of profiling can include production of visual depictions of resource use intensity to render particular pixels of a rendering output. Still further examples include counting numbers of rays that were emitted or used in generating a particular selected rendering output (e.g., a pixel). Statistics concerning these profiled data points also can be produced. Statistics can summarize per-pixel resource usage and be used to compare resource usage to render one pixel, or a group of pixels with respect to other pixels or groups. Ray tree visualization can help an artist determine whether a particular pixel is aberrantly colored, in that a ray is not going in a direction that was intended, for example. These aspects are merely exemplary of functionality that can be implemented in profilers according to the disclosure.

BRIEF DESCRIPTION OF THE DRAWINGS

FIG. 12 depicts an example method of operation of a profiler according to the disclosure;

FIG. 13 depicts an example method of scene set up which can produce inputs used in order to render a final render product during which process the profiler can gather statistics and other information an example operation of a collector;

DETAILED DESCRIPTION

Computation power continues to increase rapidly, theoretically allowing ever more complicated visual effects. However, programmatic complexity and debugging for complex visual rendering programs can be daunting. In the still-more particular field of ray tracing, many of the tools that may have been useful for debugging rasterization-based rendering do not provide the kinds of information and visual aids useful in debugging a ray tracing renderer. In an example workflow, an artist can design an animation that involves a 3-D scene (which can change during the animation) and objects which are located in the scene (such objects also can be dynamic). The artist may be designing or using shaders to simulate different effects, and materials, such as simulating hair, wood, water, smoke, and so on. Designing the scene, the objects in it and their relative arrangements is often an iterative process that involves the artist seeing a current state of rendering output, from a current state of the program, and the scene data, and deciding to make further changes to any of the inputs that affect the current rendering output. One approach to assisting visualization of how a given ray tracing renderer is behaving, performance characterization, and artifact debugging is by providing tools that embody aspect(s) described below.

In some aspects, tools according to the disclosure can work with an application programming interface (API) for abstracting hardware used in ray tracing, such that programs can be written to the API (instead of being targeted to particular hardware, although some hardware specific optimizations may still be conducted). An example of an API for ray tracing is OpenRL™ from Caustic Graphics, Inc, a division of Imagination Technologies, PLC.

In an example, a profiler tool according to such aspects can connect to a running program written for a given API, and pause that program between rendered frames to allow examination of various outputs and other metrics relating to that frame or a sequence of past frames. A more specific example of visual and functional characteristics of a Profiler according to these aspects is described below. As explained, not all such visual or functional characteristics need be present in a particular embodiment, and those of ordinary skill would be able to adapt these disclosures to select from among the visual and functional characteristics those that meet their particular needs. For example, a profiler according to an aspect provides a capability to select (such as by clicking on) a pixel in a main viewport and see what rays were emitted for that pixel for those times when an artist may wonder "why is that pixel red?"

Figure 1:
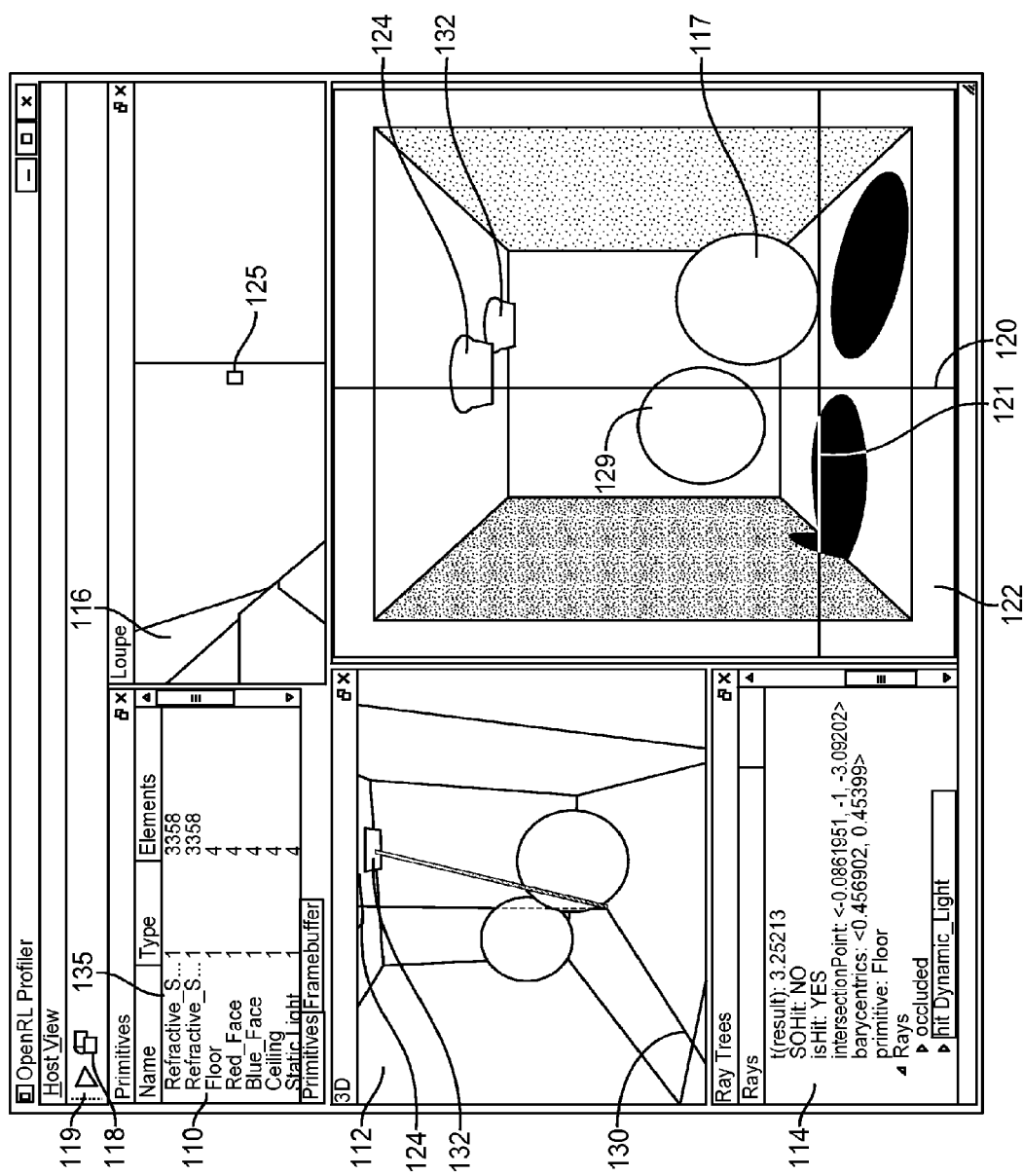
FIG. 1 is a picture of an example profiler operating with a scene comprising a Cornell box with a couple of lights and refractive spheres.
Figure 2:
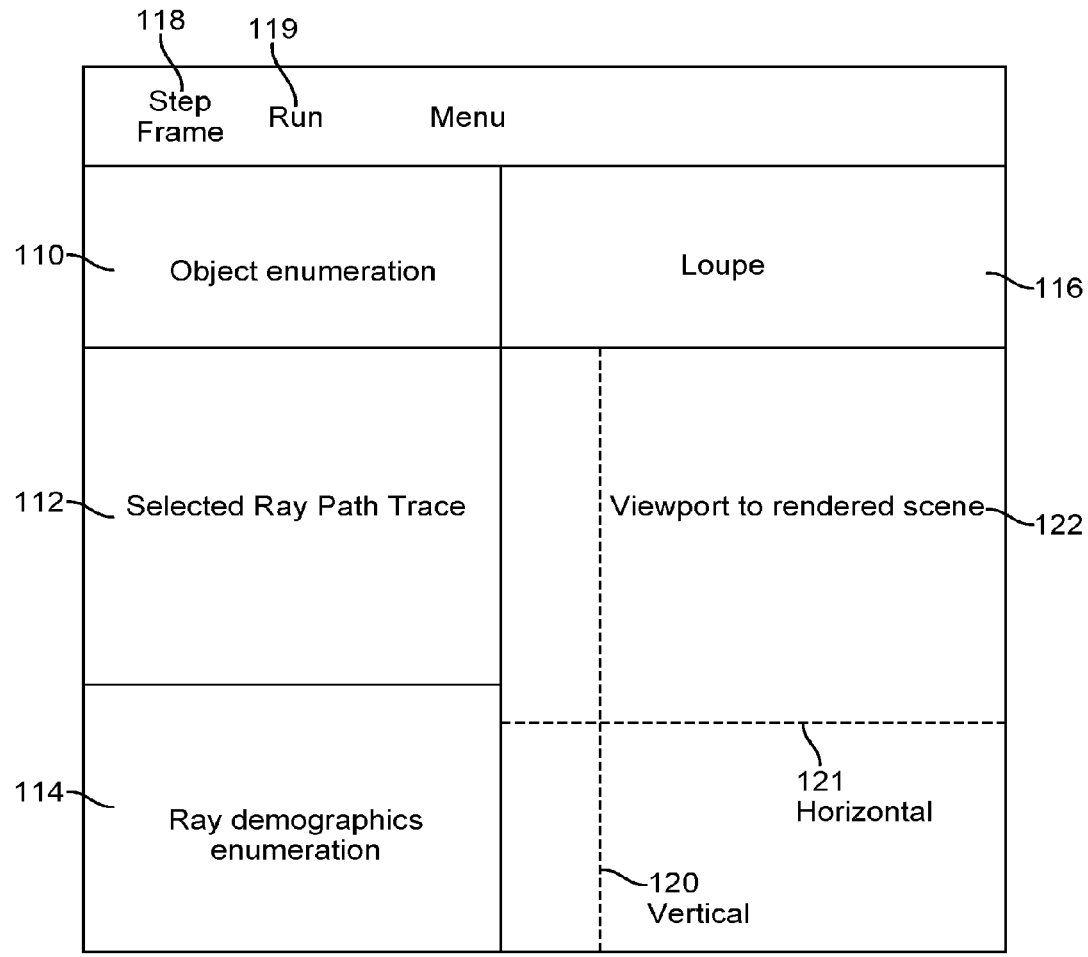
FIG. 2 depicts a schematic view of informational elements of an example user interface for profiler applications according to the disclosure.

An example profiler interface has a toolbar and six main views which show various aspects of the state of the OpenRL™ part of a program. FIG. 1 depicts an example composition of a profiler interface according to the disclosure, and FIG. 2 depicts an example block diagram of different windows and their relative arrangement, as shown in FIG. 1. With reference to FIG. 1, the six example views include objects view 110 (also known as "Primitives" in the nomenclature of OpenRL), framebuffers (e.g. 205 in FIG. 6), ray trees (114), 3D (112), Loupe (124) and Viewport (122). These views (or a subset thereof) can be made dockable (see, e.g., FIG. 6), so that they can be arranged and rearranged by a user.

An example toolbar comprises two buttons: Play/Pause 119 and Framestep 118. A running OpenRL program connected to the Profiler will stream updates to the Profiler. The interface can reflect the state of the running program as that state is updated, or at other intervals, if so desired. Activation of the "Pause" button (alternate with play button 119) causes the Profiler to pause the running application, allowing inspection of the available running program state. In one example implementation, a function called "pixel tracing" is available when the running application is paused, results of which can be displayed in 3D window 112. The term "window" is used for sake of convenience and not limitation. Any portion or region of a display can be used to display the contents described as being displayed in particular windows.

Framestep button 118, when pressed, unpauses the running program so that the running program can render exactly one frame (in an example implementation). As such, framestep is analogous to a "step over" command in a traditional source code debugger. In the context of ray tracing, a framestep function can be helpful in debugging multi-pass programs. An example multipass program is an Adaptive Anti-Aliasing program. In a situation where the running application is paused, but the application does not happen to stop on a pass of interest, the Framestep button can be used to arrive at the pass of interest. The example depiction of a interface element for stepping through frames of a sequence of frames to be ray traced is an example of disclosure that includes other approaches to frame stepping, or other kinds of intermediate pausing, stopping and continuing, which include parameterized or scripted approaches, where an interface can display elements according to this disclosure, updated according to the script or parameters specified. A user can program the script, or otherwise create or input parameters that cause desired stepping, pausing, and restarting behavior.

In an example, a framebuffer selector pane shows all attached color buffers for the currently active/bound framebuffer object. A selected color buffer will be displayed in a principal viewport view (e.g, 122).

The principal viewport 122 displays contents of a currently selected color buffer from the Framebuffer pane (implementations may also comprise a plurality of viewports, such that there may not be a single principal viewport). In an example, when the mouse is within the principal viewport 122, a cursor can be displayed as a crosshair (in FIG. 1, depicted as vertical line 120 and horizontal line 121 that intersect). Loupe 116 pane will show thus show a magnified view of a vicinity of a current cursor position. In an example, a click inputted in the viewport causes the profiler to display (e.g., in 3D 112) information about rays that were traced to produce the color information represented by that pixel in that buffer. In an example, if the application is not paused when a click is received, the application is responsively paused. In an example, the currently selected pixel will be marked by longer crosshairs 120, 121 that extend to the edges of the displayed viewport (or to an end of an image, such as where the image may not extent fully to the edges of the viewport).

A ray tree pane (e.g., 114 of FIG. 1 and 209 of FIG. 6) presents a list of all pixels clicked on for a displayed frame and presents each pixel as a tree of rays than can be examined. A ray tree also can be selected through the viewport 122 and Loupe 116 panes as was previously described.

3D pane 112 shows visible geometry of the current frame as well as the rays of the currently selected pixel trace or traces (such as those selected in the "ray Trees" pane). This view can be navigated by clicking in the view or using the "w", "a", "s" and "d" keys to go forward, left, back and right, respectively as well as "r" and "f" to go up and down respectively. A viewpoint (a perspective from which the geometry is viewed, with the rays arranged spatially with respect to the geometry) can be adjusted by clicking and dragging in the view. See FIG. 4, with ray tree 130 identified (130 points to one ray in a ray tree, and thus serves to identify both that ray and the other rays that are related to that ray). Note that a light 124 (FIG. 1)) can be represented as a colored shape 132, indicative of a light, rather than as a realistic depiction of a source of photon energy, per se.

Figure 3:
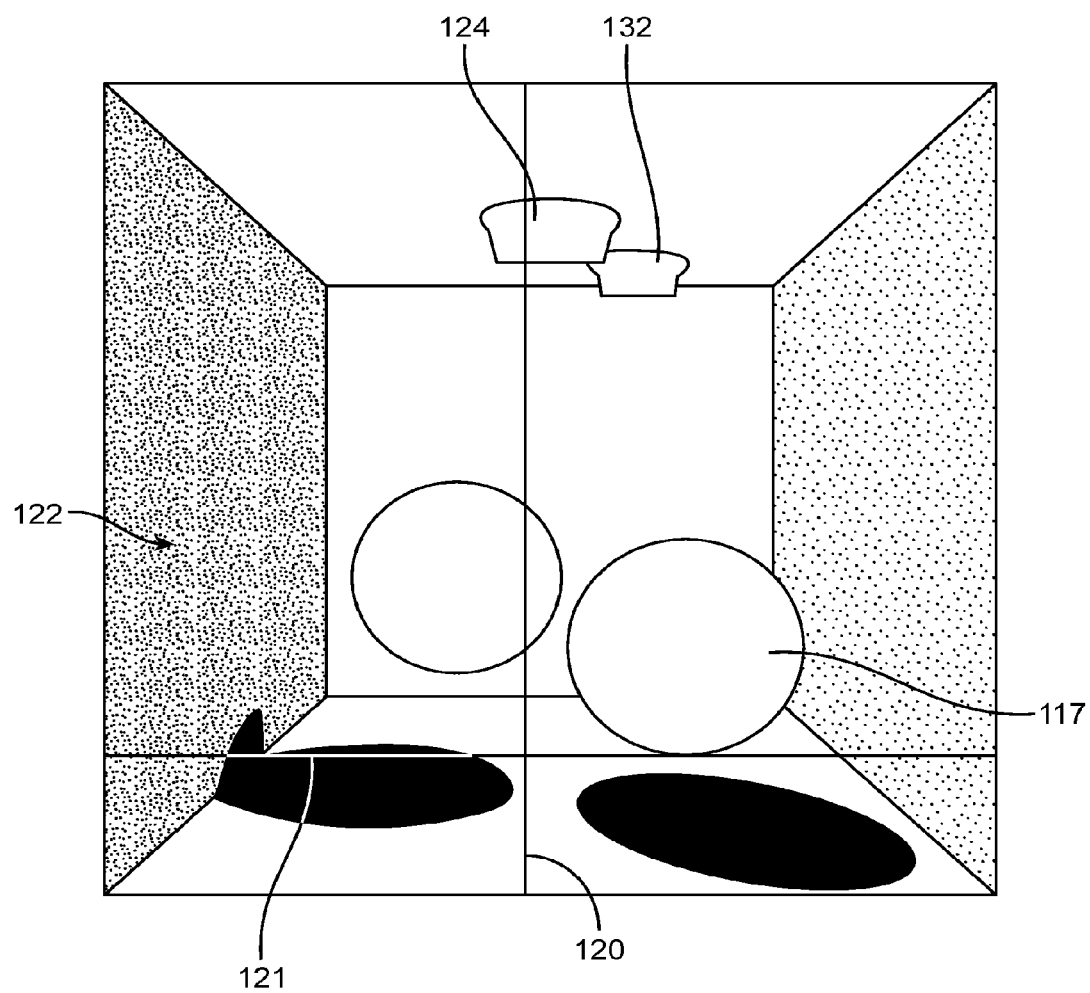
FIGS. 3 and 4 depict larger views of interface elements introduced in FIG. 1.
Figure 4:
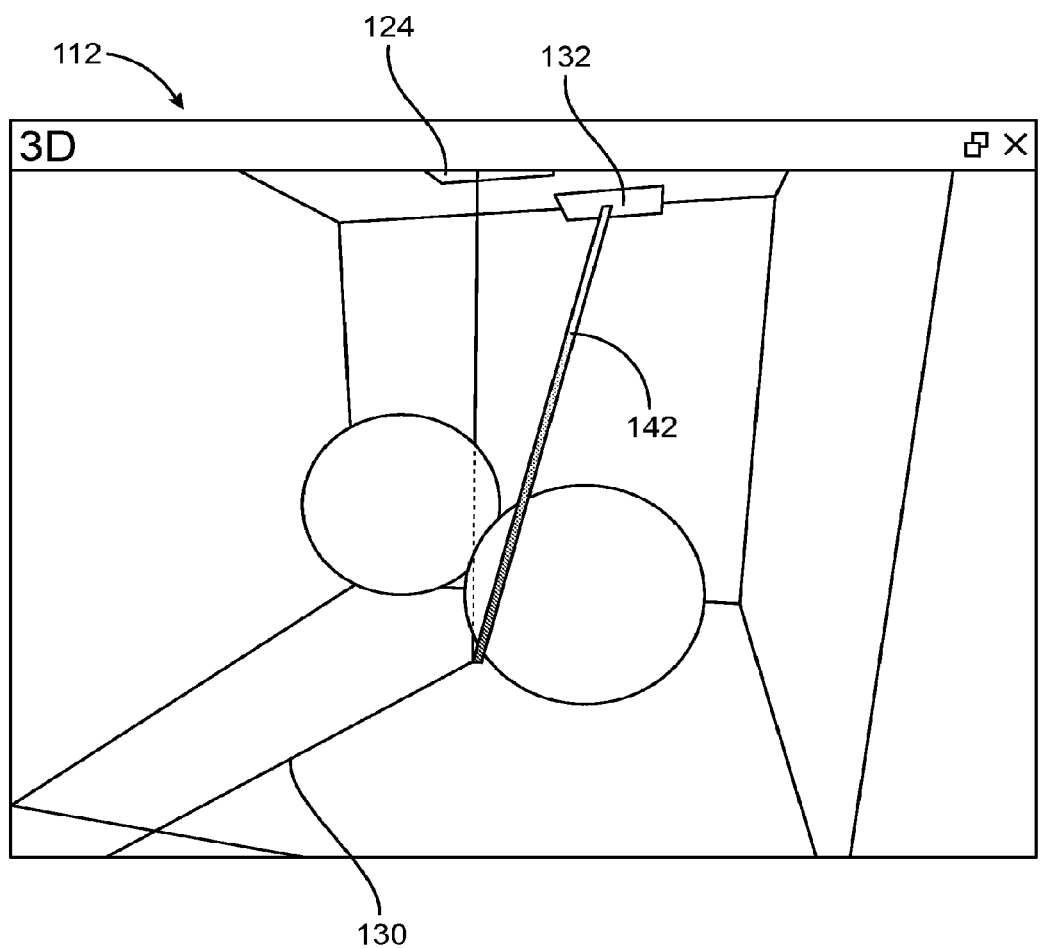

Example scene geometry in the Cornell box rendering includes a sphere 117 (see enumeration in object pane 110 also) and light 124. FIGS. 3 and 4 depict in further detail aspects of view window 122 and 130, introduced with respect to FIG. 1. These windows respectively show a fully rendered output (FIG. 3) and FIG. 4 depicts a debug view where certain rendering features can be turned off (e.g., by withholding contributions resulting from those rendering features from a final render buffer used to produce the view shown in FIG. 4). For example, a shadow caused by sphere 117 may not be depicted in FIG. 4, although it is depicted in FIG. 3. A perspective or view point also may differ and be separately manipulated between these windows. For example, window 130 can be set to view the backside of sphere 117, even as the scene is rendered from the same viewpoint as in FIG. 3.

Figure 9:
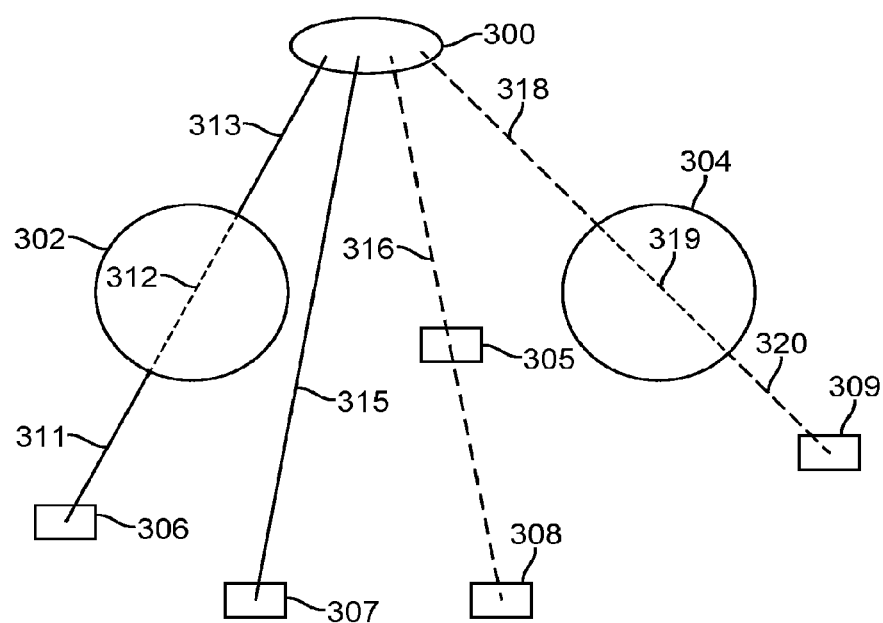
FIG. 9 depicts examples of how visual depictions of rays can be varied to indicate different characteristics concerning the rays.

In an example, to make ray behavior easier to understand, rays can be visually distinguished to show direction. In a particular example, rays can be visually depicted with a color gradient to show direction (e.g., from a saturated color to black, or to white, or from black to white). For example, FIG. 9 depicts examples of situations where rays may be visually distinguished from each other, or a portion of a ray may be visually distinguished from another portion of that ray. FIG. 9 depicts that a light 300 can be a destination for rays 311, 315, 316, and 318, shown as emitted from surfaces 306-309, respectively. In FIG. 9, ray 311 is behind object 302, as viewed from a current viewpoint, so that a visual depiction of ray 311 is shown differently in portion 312, and reverts to an unobstructed visual depiction in portion 313 (portion 313 may be depicted differently from a portion near a ray origin, in that rays can be depicted with a color or shade gradient to show direction). By contrast, ray 315 is shown as a ray that has a path completely visible from the viewpoint. Ray 316 was occluded (by object 305) in the rendering of the actual rendering output (i.e. not the debug view), and is therefore visually depicted differently than ray 315 (and ray 311). Ray 320, emitted from surface 309, depicts a remaining possibility for occlusion rays, in which ray 320 was occluded in producing the actual rendering output, and the ray also has a portion which is obscured by geometry (object 304) in the viewport, such that a portion 319 of ray 320 is depicted differently than portion 318.

Figure 10:
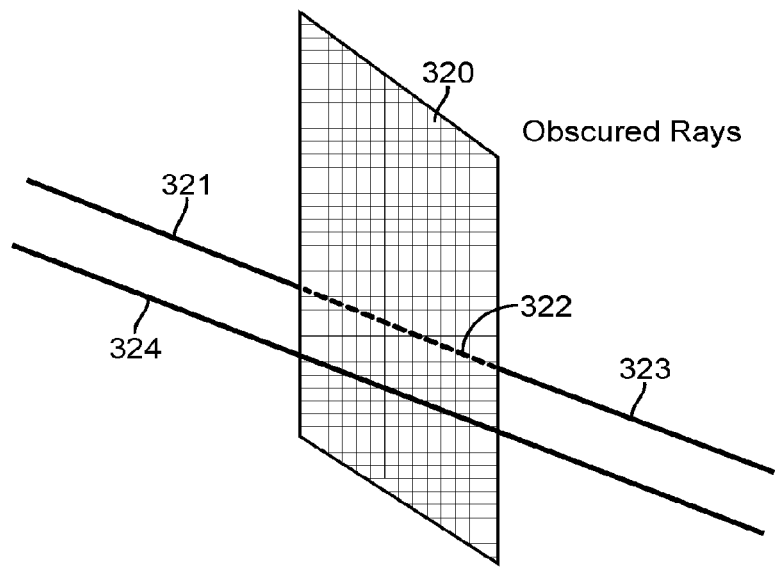
FIG. 10 depicts further aspects of varying characteristics in the particular situation of rays that are obscured by geometry from a particular perspective.

FIG. 10 depicts another example of how a ray can have different portions depicted different visually, depending on their relative location to scene geometry and a current viewpoint. In particular ray 321 is behind object 320 in a portion 322 of its path and reverts to a non-obscured view at 323, while ray 324 is in front of object 320 (all relative to a viewing location, and thus, these visual depictions may change as the viewing location is changed).

Figure 11:
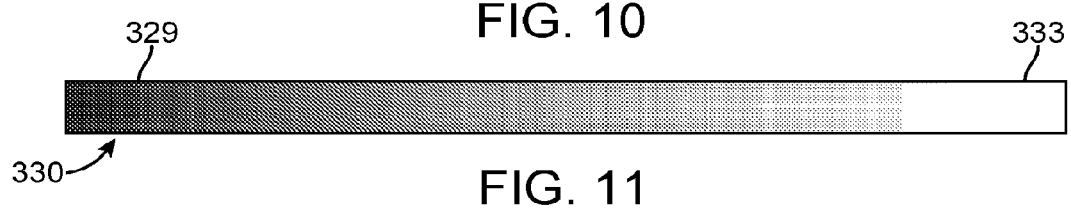
FIG. 11 depicts an example of using gradients to show ray direction.

FIG. 11 depicts that a ray 329 can have a color or shading gradient from an origin 330 to a destination 333.

Figure 5:
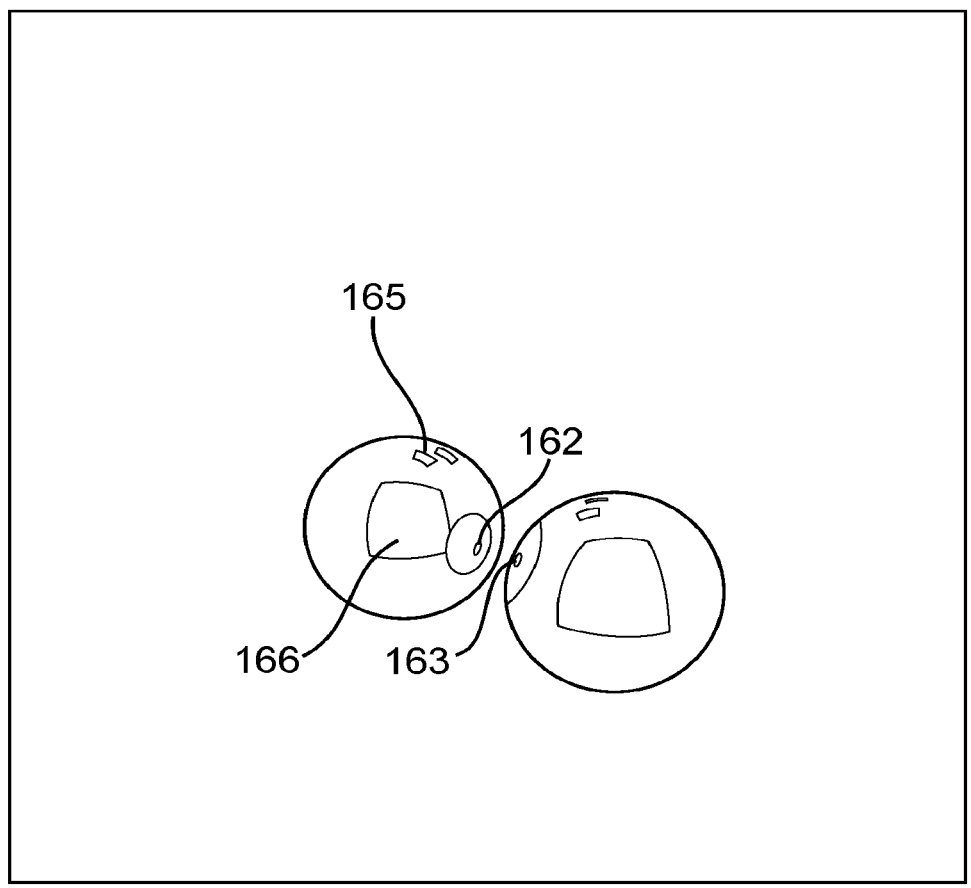
FIG. 5 depicts render output it's indicative of a measure of computational complexity (e.g. a color coded indication of a number of rays that were traced in order to render each pixel of a final render product, such as that depicted in FIG. 3)

FIG. 5 depicts examples of a 2-D grid of pixels corresponding to pixels of a principal rendering (e.g., the scene rendering in 122 of FIG. 1). Products such as those depicted in FIG. 5 can be used to depict different analytical products, such as a number of rays that were emitted or used in determining a color of a corresponding pixel in the principal rendering. Different colors can be used to represent different counts of rays. For example, in FIG. 5, references 162-163 identify portions of spheres 117 and 129. For example, spheres 117 and 129 can be refractive and reflective, such that light can be concentrated at these portions 162, 163. Thus, such a rendering process would identify these areas as being significantly different in terms of computation or rays used to complete the pixels in those areas. Similarly, references 165 and 166 identify portions of sphere 129 that have comparatively different computational complexity. Such information provides a visual depiction of a relative cost to render different pixels in the principal rendering. Examples of depiction of such relative cost or computational complexity are provided below.

Figure 6:
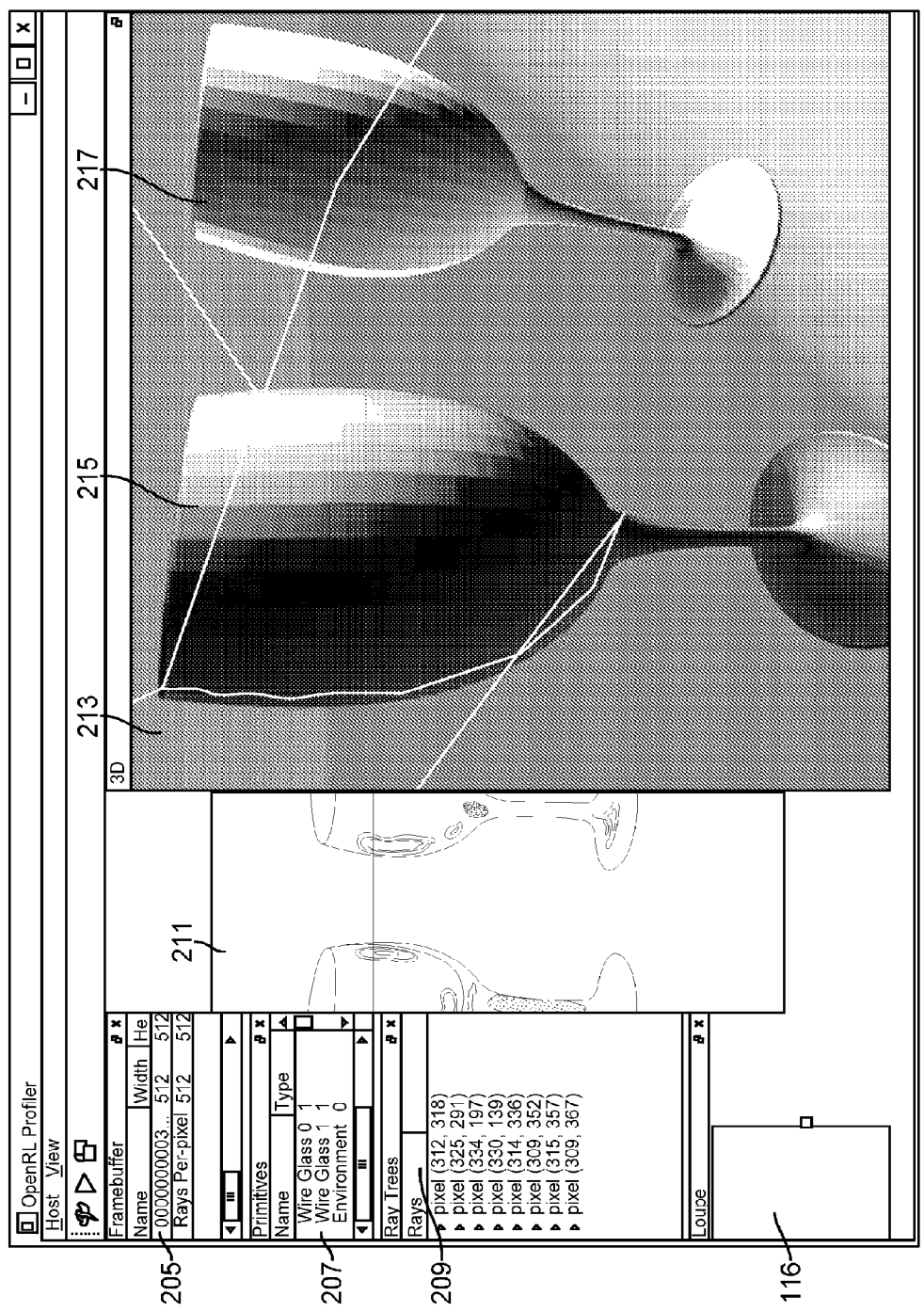
FIG. 6 depicts another example of a profiler view configuration according to this disclosure operating on a different scene.

FIG. 6 depicts another example of interface elements in an example rendering. A framebuffer 205 selector enumerates an available selection of framebuffers (e.g, a principal rendering, or analytical products such as computational cost maps, such as 211 and those depicted in FIGS. 5 and 6). Ray tree selector pane 209 and objects pane 207 are displayed. A 3D window 213 (also depicted in FIG. 7) depicts objects 215 and 217.

Figure 7:
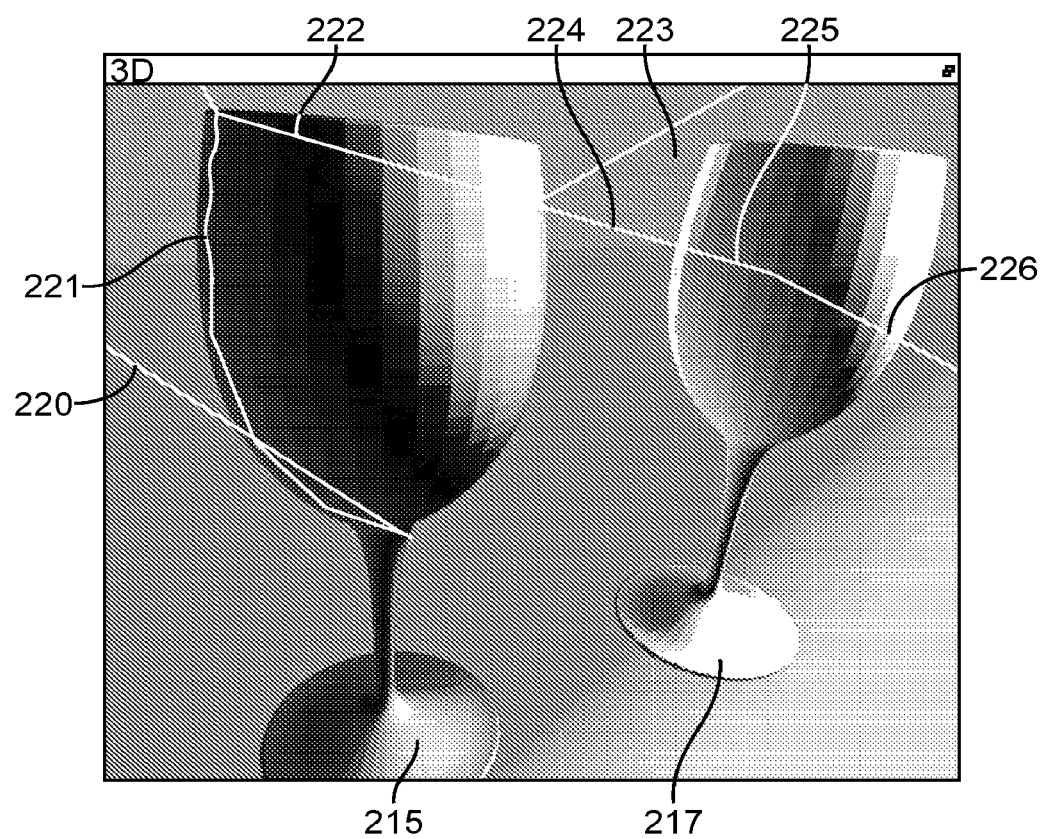
FIG. 7 depicts a different illustration of a 3-D window in which ray trees are depicted relative to geometry in the 3-D scene from which the final render products are to be made.

FIG. 7 depicts a ray tree 220, and its constituent components that travel through objects 215 and 217; some of these constituent rays are identified 221-226. These rays were emitted during execution of one or more shader modules that were identified based on intersection testing of rays in the scene. Shader modules are an example implementation of program components that can be used to implement a ray tracing program. However, some ray tracing programs can be implemented as one or a few large programmatic components. In order to implement the stepping and pause functionality described below, program components can also include indications or flags to determine where stepping or pauses can or should be undertaken.

Figure 8:
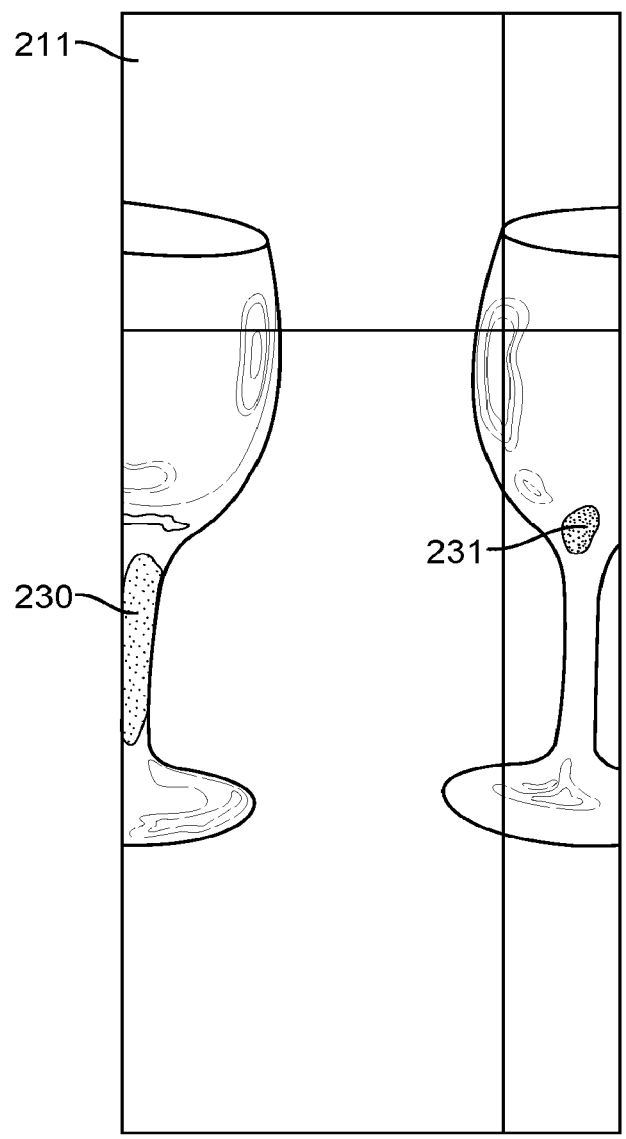
FIG. 8 depicts a larger view of a computational complexity map first shown in FIG. 7, where areas of different grayscale represent areas of computational complexity different from surrounding areas.

FIG. 8 depicts a larger scale depiction of 211, first introduced in FIG. 6. FIG. 8 identifies example regions 230 and 231 which have different shading or coloration than their surrounding areas, which can indicate a number of rays for each pixel, in one example. In other examples, other analytical products can be depicted in such a gray scale or color oriented map.

Figure 14:
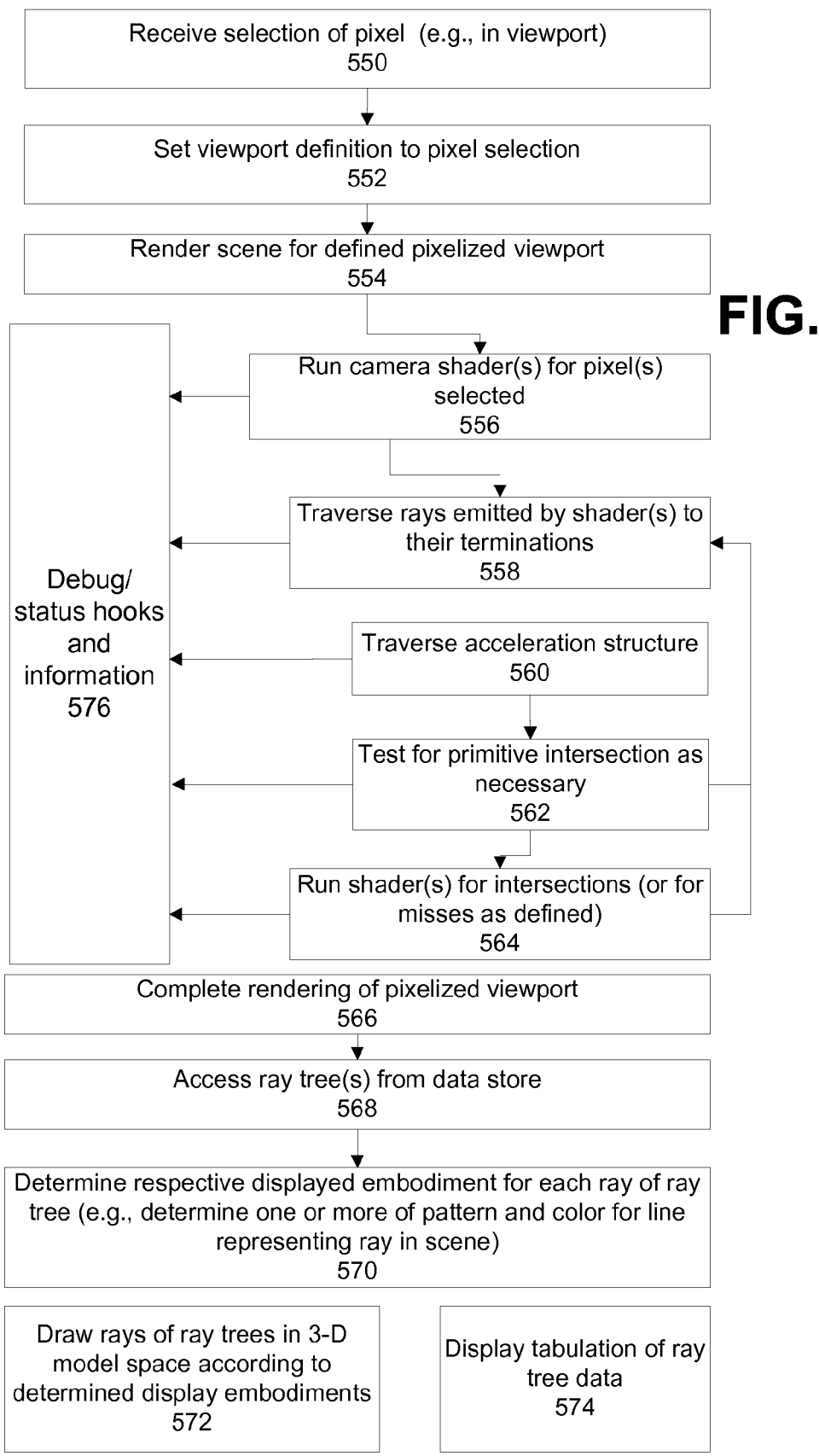
FIG. 14 depicts another example method of operation of a profiler according to this disclosure.

FIG. 13 depicts a method according to an example aspect of the invention. The depicted method comprises determining (505) a set up for a scene to be rendered. Such set up may comprise loading geometry for objects in the scene, textures to be sampled, locations of lights, procedural geometry deformations, and so on. FIG. 14 presents an example method which includes steps that can be taken during scene set up. In particular steps may comprise accessing (525) geometry for objects in the scene, movement of objects between frames in a multiframe rendering can be determined (527). Some portions of the program controlling scene rendering may cause deformation of objects in such deformation can be determined (529). An acceleration structure or portions thereof can be built or rebuilt (531). Movement of the camera can be determined (533). Other setup and definitional information can be loaded or used to configure programmatic variables as applicable (537).

Based on the set up for the scene a 2-D image of the scene is rendered (507). Such 2-D image is rendered based on a viewpoint (camera location) and the pixel grid is interposed between the 3-D scene and the viewpoint. Typically the pixel grid is a predetermined height and width. The rendered 2-D image can be displayed (509) in a viewport. Horizontal and vertical crosshairs can be overlaid (511) on the displayed image. As described above, such crosshairs can be used as an indication of a pixel that is currently selectable.

The method further comprises showing (513) a magnified region of the displayed image in the vicinity of the intersection between the horizontal and vertical crosshairs within a loop window. Input indicative of a selection of a pixel or pixels in the rendered and displayed image can be received (515). In one example, the selected pixel(s) can be used in a database lookup (517) to identify a tree of rays that contributed to a final rendering of that pixel in the displayed image. In some implementations, a further step of determining (519) rays that were shot during rendering of the displayed image but which did not contribute to the final rendering can be undertaken. However, in other implementations, all rays emitted during a rendering of the selected pixel can be stored and presented together, regardless whether each ray contributed to the color of the selected pixel or not.

For the rays, distinguishing visual characteristics for each ray to be displayed can be determined (521). In one example all rays are displayed whether or not they contribute to the pixel color itself. Subsequently, each ray of the tree of rays is depicted (539) according to its distinguishing visual characteristics in a window that also contains a display of the scene objects. This display is a three dimensional display viewed from a viewpoint, which can be changed independently from a viewpoint used to render of the 2-D image (507). The method can return to allow a setup of the scene to be revised, such as for a subsequent pass in a multipass rendering, or for a subsequent frame.

In general, ordinary rays can be displayed, in an example, in a black to white gradient. In a further example, if a particular ray did not hit any scene object, then that ray can be visually distinguished from rays that hit some scene object. In one example, a dashed pattern can be used for one or the other. A currently-selected ray also can be visually distinguished from other rays, such as by showing such ray in a different color, such as green.

In some implementations, certain types of rays can be treated differently, in order to better visually communicate characteristics particular to rays of such types. For example, if a ray is an occlusion-test ray it can drawn with a red-to-white gradient. As with ordinary rays, occlusion test rays can further be visually distinguished based on hit or miss information, such as by using a repeating gradient for either a hit or a miss. In an example, if an occlusion test ray is occluded, it is drawn with a blue-to-white repeating gradient but the ray still can be drawn to a termination point, (e.g., where information about which object caused the occlusion is unavailable). This disclosure refers to selecting pixels, in order to determine a tree of rays to be displayed. This disclosure is exemplary, in that implementations according to this disclosure can include a variety of mechanisms to determine selection of pixels to be examined. Such selection can include a determined list of pixels, or flags that can be set by program components.

In an aspect, where a ray is obscured by geometry (from a current perspective of the view in the 3-D pane) the ray can be drawn differently in areas where the ray is obscured (e.g., using a black and white screen-door pattern).

An object pane shows a list of all objects in the scene and various statistics about them. The currently selected primitive will be drawn in the 3D pane in a bright green color.

Figure 15:
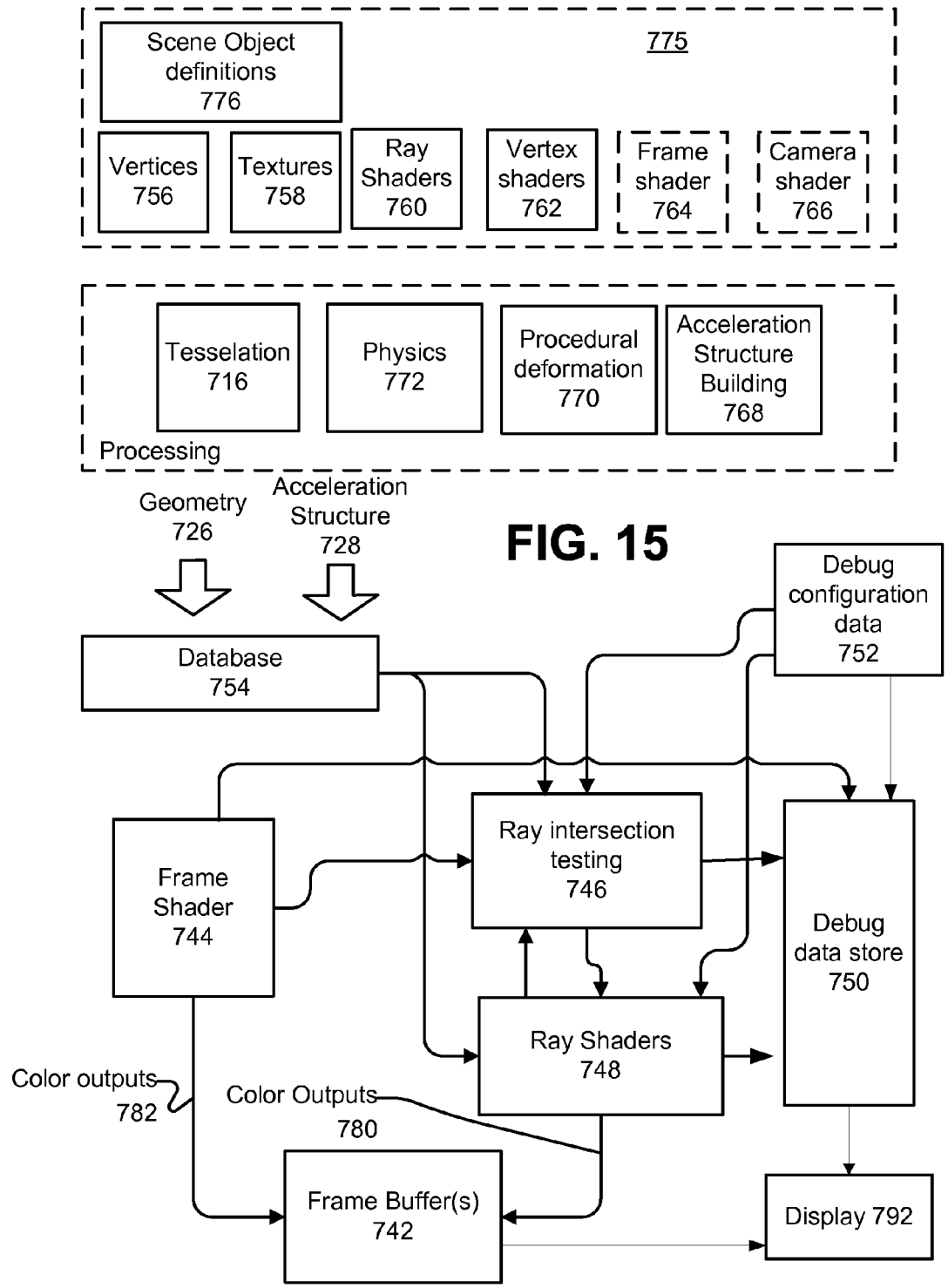
FIG. 15 depicts a block diagram of an example system in which a profiler according to this disclosure can be implemented.

FIG. 15 depicts a further example implementation of aspects introduced above. One characteristic of the example method depicted in FIG. 15 is that a frame can be rendered without retaining information required to produce the ray trees introduced above. Rather, the ray tree information is generated responsive to selections of pixels for which ray tree information is desired. More particularly FIG. 15 shows that one approach to achieving such a system is to define a viewport as comprising a pixel for which ray tree information is desired, in a manner according to how any 2D scene rendering is produced. This approach drastically reduces memory storage requirements for intermediate ray state and reduces system load substantially.

FIG. 15 thus depicts that a selection of a pixel is received (550) and then a viewport definition is set (552) to the pixel selection and the scene can be rendered (554) according to the exemplary constituent process elements described below. The camera shader for emitting rays is run (556); in some examples, the camera shader is common to all pixels of the 2-D rendering and in other examples the camera shader may vary among pixels of such 2-D rendering. A step of intersection testing (traversing) (558) the one or more rays emitted by the camera shader is undertaken. Such traversal (558) may comprise traversal (560) of an acceleration structure comprising interconnected elements, such as a hierarchical acceleration structure, such as a KD tree. Such traversal (558) may further comprise testing (562) primitives for intersection with the emitted rays (in this disclosure, the term primitives can equally be used to describe components that build an object, such as triangles to build a glass, as well as objects themselves to no loss of generality). Traversal (558) may include a loop including primitive testing (562) and acceleration structure traversal, depending on implementation.

For any intersection identified, one or more shader modules are identified (564) and executed in order to determine what effect the identified intersection will have on the finally rendered color of the selected pixel. By particular example, an intersected object can be associated with the shader module which is executed when that object is intersected. The executed shader module may emit one or more rays that will require intersection testing. For any such rays emitted traversal (568) is repeated.

After all rays that were emitted by the camera shader and any shaders identified by traversal of any other rays emitted have been intersection tested and any shader modules so identified have completed their ray emission, the rendering of the pixelized viewport can be considered complete (566). In most cases, it would be expected that a contribution or effect of each ray shader to a color of a pixel would be too rapid to be able to detect each individual contribution. In some aspects, a stepped execution of ray shaders also can be implemented, such that progress in rendering a given pixel proceeds more slowly so that a user can observe such progress in color changes to the pixel, in conjunction with identifications of a currently executing ray shader.

In each of these steps (traversal 558 and shader execution 564) data concerning what was done during such steps is output to a store of debug status information (576). In one example such data is extracted by hooks that can monitor API calls made by the rendering program. Such data comprises information about the rays that were emitted and processed during the rendering; such data can be accessed (568). The accessed ray data is used to determine (570) appropriate visual displays for each ray, depending on characteristics of such ray, which may comprise a type of ray, whether the ray intersected or missed, and how the race spatially relates to objects located in the 3-D scene. These visual displays are then drawn (572) in a 3-D model space with the 3-D scene objects. The tabulation of such ray tree data also can be displayed (574).

A framebuffer can be populated with color information derived from observations of pixels being rendered. For example, a framebuffer can be created with per-pixel color information representing how many rays were traced in order to produce the final render product for that pixel (other types of color information also can be created, which can each represent information about a computation cost to produce the final render product for a given pixel. In some cases, the information can be provided for each pixel of the render output, while in other situations, only a subset of information for the pixels can be provided. In other situations, other information relating to computation cost can be tracked and outputted, such as outputted according to a visual colorized information output.

FIG. 15 depicts an example system in which profilers according to this disclosure can be implemented. A source of program and scene set up data 775 can store scene object definitions 776, such as descriptions of vertices of the triangle meshes defining geometry for seeing objects. Other kinds of data that may be used in order to determine a set up for a scene rendering include vertices 756, textures 758, ray shaders 760, vertex shaders 762, frame shader 764, and camera shader 766. Depending on implementation, shaders such as frame shader 764 and camera shader 766 can be implemented by one program module. In general ray shader 760 refers to portions of program code that are executed when a ray intersection is identified. Different implementations may organize such program code differently. In some implementations each scene object has one or more associated ray shaders. Other kinds of processing can be programmatically or otherwise implemented in a graphics processing pipeline including features such as tessellation 716, physics effects 772 procedural deformations 770 and housekeeping functions such as building acceleration structures 768. These kinds of processing are by way of example rather than limitation in order to put aspects of the disclosure in context. An output from scene set up will include geometry 726 for the scene to be rendered, typically an acceleration structure also is provided 728. Other kinds of information would include a location and a resolution of a pixel grid that is to be an output of rendering and the location of a camera (a perspective) from which the 3-D scene will be viewed in order to produce the pixel grid output. This data can be stored in a database 754, such as a database located in a main memory.

In order to process the scene a frame shader 744 can begin to emit rays that will be traced in the scene by ray intersection testing 746. Frame shader 744 also can output color information to a frame buffer 742. For the purposes of this disclosure, how ray intersection testing is implemented is immaterial. An output of ray intersection testing is an indication whether the ray intersected something in the scene or missed. If the ray intersected something the output would also specify information that allows identification of a shader code module to be executed. In some implementations other information such as barycentric coordinates for the point of intersection, can be outputted along with the intersection information.

Ray shader 748 can be executed based on outputs from intersection testing 746. Execution of ray shader 748 provides color outputs 780 to frame buffer or buffers 742. Each of these functional units depicted can communicate outputs to debug data store 750 during their operation. Debug configuration data 752 can be used to indicate which data is sought to be captured for a particular debug cycle. According to one aspect, debug configuration data can include inputs received through an interface, such as a graphical interface displayed on a display 792 (examples of such user interface aspects were disclosed above).

Further in one example aspect such inputs can be used in identifying or defining operation of a frame shader 744 to shade a frame consisting of pixels for which ray tree information is desired, instead of all the pixels of a 2-D grid that is intended to be a final render output product. In some implementations, each frame shader can shade a single pixel, and where multiple pixels are selected (see e.g., FIG. 6), a list of pixels to be rendered can result in running a frame shader for each pixel. As such the system depicted in FIG. 15 can operate in a number of iterations with different frame shaders.

Figure 16:
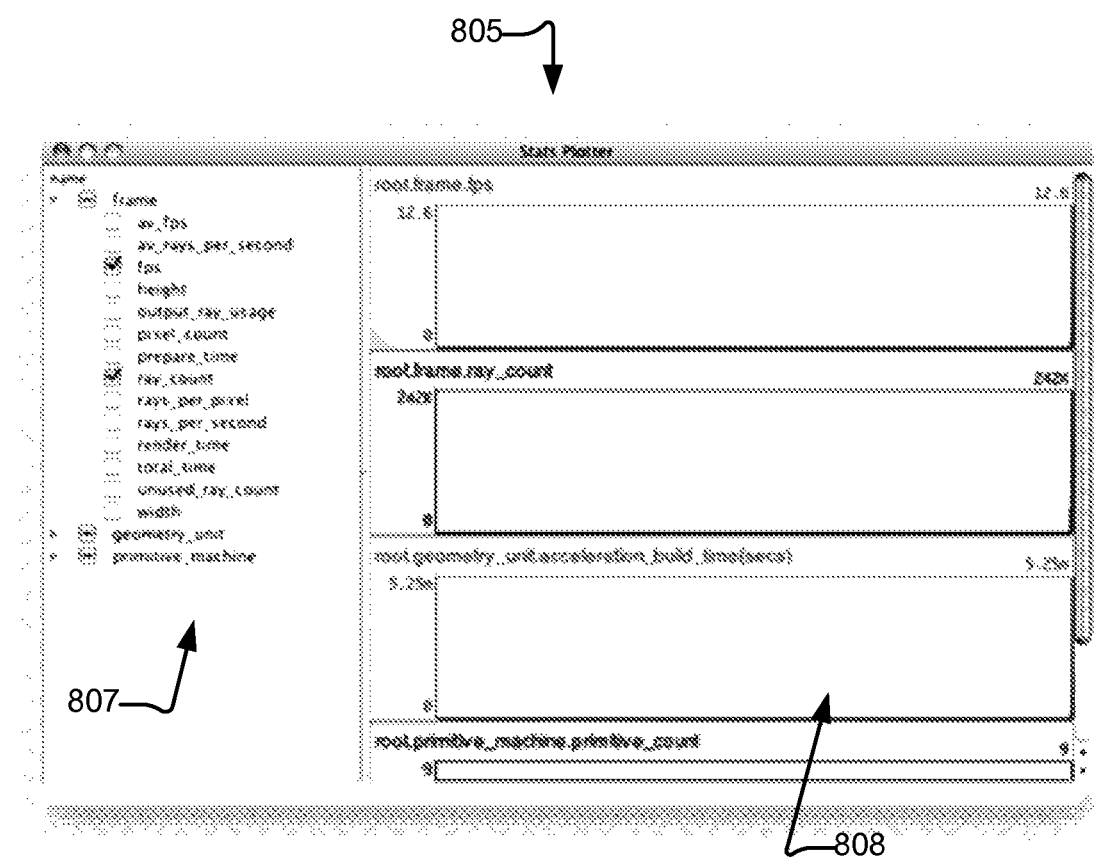
FIG. 16 depicts an example interface in which statistics concerning various aspects of a ray tracing renderer and its operation to render a specific scene can be displayed.

FIG. 16 depicts a statistics plotter interface 805, which provides additional approaches by which information about a scene rendering can be selected and displayed. Interface 805 includes a menu 807 of available statistics that can be displayed, such as average frames per second ("av_fps"), ray count ("ray_count"), and so on. Menu 807 can be subdivided by the category of statistic, or a part of a rendering pipeline that performs a relevant part of the processing. For example, statistics relating to a rendered frame can be identified under a "frame" category, while statistics relating to a geometry unit and a primitive machine each can be given a separate category. A selection of one or more available statistic categories causes data for those selected statistic categories to be displayed in display window 808. Tables 1-6 give an example set of statistics that can be gathered during a rendering process, and which can be selected for display in interface 805.

By further example, frame shaders can be implemented in order to produce computational complexity maps in which each map includes pixels corresponding to pixels of the final render product, where the pixels of the map include information about computational complexity to render the corresponding pixel of the final render product. Examples of measures of computational complexity were disclosed as including a number of rays that were emitted or which actually contributed to the color of the final render pixel amount of time required to render the pixel, a number of tests in the acceleration structure in order to render that pixel, and so on. This data can be normalized according to averages or other normative statistics or measures for all the pixels of the final render product.

Aside from the above example aspects, other aspects can include gathering of statistics concerning various aspects of the running application. In some examples, a statistics gather tool can communicate with an application being monitored through TCP/IP ports. in some aspects, such communication can be enabled or disabled by passing attributes in an API call, or otherwise setting values in a configuration or setup field or information store. In some examples, a tree of available statistics can be displayed, allowing selection of statistics of interest. Tables 1-6 depict various statistics that can be gathered or monitored, by functionality according to the aspects disclosed herein.

As different types of statistics are selected, their values can begin to be plotted in an interface element, such as a window pane. In some examples, these statistics are updated every frame. A given selection of statistics can be remembered across runs for a given program and for different rendering programs as well. In some implementations, particular selections of statistics can be associated with a profile and saved for use with particular kinds of programs, for example. FIG. 16 depicts an example graphical interface by which statistics to be plotted can be selected and the selected statistics can be outputted.

In this disclosure, a variety of techniques were disclosed to provide a visual depiction of numerical values, relative values between and among different metrics, as well as between and among different pixels of a rendering output. Such techniques can be used to visually distinguish different scene objects from each other, as well as to set out metadata or other characteristics pertaining to the scene object or other detail sought to be communicated. The techniques disclosed herein are by way of example, rather than limitation. Coloration cannot be visually depicted in black and white color drawings compliant with patent office drawing requirements. As such, color information may be described in the specification, and may in other instances be depicted as gray scale, cross hatching, or other drafting techniques. Still further, a person of ordinary skill would be able to understand that these techniques are exemplary and devise a particular set of techniques and visually distinguishing features that meet the needs of a given situation or user. This specification frequently treats the display of various renderings and other information. However, the concept of display is an example of kinds of output, rather than limitation. For example any of these kinds of data, renderings, statistics and so on can be outputted for storage on a tangible computer readable medium.

The order of activities depicted in the diagrams is not by way of limitation that such activities must be, or are preferred to be performed in that order. Additionally, there may be situations where not all depicted activities are performed for a given synchronization operation. For example, some data or table organization or formatting may already have been performed, and so, such activities would not need to be performed again.

As would be apparent from the disclosure, some of the components and functionality disclosed may be implemented in hardware, software, firmware, or any combination thereof. If implemented in firmware and/or software, the functions may be stored as one or more instructions or code on a computer-readable medium, in one example, the media is non-transitory. Examples include a computer-readable medium encoded with a data structure and a computer-readable medium encoded with a computer program. Machine-readable media includes non-transitory machine readable media. Other kinds of media include transmission media. A non-transitory medium may be any tangible medium that can be accessed by a machine. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a machine.

Those of skill will also appreciate that the various illustrative logical blocks, modules, circuits, and algorithm steps described in connection with the embodiments disclosed herein may be implemented as electronic hardware, computer software in a computer-readable medium, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The description of the aspects and features is provided to enable any person skilled in the art to make and use the systems, apparatuses and perform the methods disclosed. Various modifications will be readily apparent to those skilled in the art, and the principles described in this document may be applied to other aspects without departing from the spirit or scope of the disclosure. Thus, the description is not intended to limit the claims. Rather, the claims are to be accorded a scope consistent with the principles and novel features disclosed herein.

The drawings include relative arrangements of structure and ordering of process components, solely as an aid in understanding the description. These relative arrangements and numbering is not an implicit disclosure of any specific limitation on ordering or arrangement of elements and steps in the claims. Process limitations may be interchanged sequentially without departing from the scope of the disclosure, and means-plus-function clauses in the claims are intended to cover the structures described as performing the recited function that include not only structural equivalents, but also equivalent structures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than, additional to, or less than, those identified herein. Rather, the described features and steps are disclosed as examples of components of systems and methods within the scope of the appended claims.

TABLE 1

| GLSL | |
| --- | --- |
| compile_time | The total time spent compiling shaders that frame. |
| link_time | The total time spend linking programs that frame. |

TABLE 2

FRAME statistics

| | |
|---|---|
| av_fps | The total number of frames rendered throughout the life of the program divided by the total time it took to render each frame (total_time). |
| av_rays_per_second | The sum of all values of rays_per_second divided by the total number of frames rendered throughout the life of the program. |
| fps | One divided by the time spent in rlRenderFrame ( ) (total_time). |
| height | The height of the current frame. |
| width | The width of the current frame. |
| output_ray_usage | The percentage of declared output rays used this frame. See documentation on the "setup" shader entry point and rl_OutputRayCount. |
| pixel_count | The width of the current frame multiplied by the height of the current frame. |
| prepare_time | The time spent in rlRenderFrame ( ) preparing to begin actual rendering. It can be thought of as time in rlRenderFrame that wasn't spent rendering. |
| ray_count | The total number of rays emitted in a single frame. |
| rays_per_pixel | The total number of rays emitted in a single render divided by the number of pixels in the current frame. |
| rays_per_second | The number of rays emitted for the current frame divided by the time it took to render that frame (render_time). |
| render_time | The time in rlRenderFrame ( ) spent rendering (see prepare_time). |
| shadow_opaque_hit_rate | The percentage of all rays emitted that were shadow opaque hits. |
| total_time | The total time spent in rlRenderFrame ( ) (prepare_time + render_time). |

TABLE 3 geometry_unit

| | |
|---|---|
| acceleration_build_time | The amount of time it took to build the acceleration structures for this frame. |
| vertex_shader_time | The total amount of time spent running vertex shaders this frame. |

TABLE 4 per_primitive

| | |
|---|---|
| execution_count | The number of times the named primitive's ray shader was executed. |
| output_ray_utilization | The percentage of allocated rays were used by the named primitives's ray shader. |
| avg_ray_shade_time | The amount of time spent each execution of the named primitive's ray shader, on average (total_shade_time + execution_count). |
| total_shade_time | The total amount of time spent executing the named primitive's ray shader. |

TABLE 5 per_program

| | |
|---|---|
| execution_count | The number of times the named program's ray shader was executed. |
| output_ray_utilization | The percentage of allocated rays were used by the named program's ray shader. |
| avg_ray_shade_time | The amount of time spent each execution of the named program's ray shader, on average (total_shade_time + execution_count). |
| total_shade_time | The total amount of time spent executing the named program's ray shader. |

TABLE 6

Primitive machine

| | |
|---|---|
| primitive_count | The total number of primitives in this frame. |

What is claimed is:

1. A machine-implemented method of assisting in the debug of a ray tracing renderer that comprises a plurality of shader modules, the method comprising:

configuring a rendering system to generate a 2-D grid of pixels from a 3-D scene description, the configuring comprising accessing a 3-D scene description comprising geometry representative of objects in the 3-D scene, wherein one or more of the shader modules determines effects of intersections between emitted rays and objects in the 3-D scene in order to generate a 2-D grid of pixels from the 3-D scene viewed from a first perspective, and wherein at least some of the emitted rays are emitted during execution of one or more shader modules identified by intersection testing of rays in the scene;

determining a portion of the 2-D grid of pixels;

causing the rendering system to generate color outputs for the determined portion of the 2-D grid;

determining information about emitted rays, said information for an emitted ray including an identification of a shader module which emitted the ray;

determining visual characteristics for representations of the emitted rays using the determined information, wherein the visual characteristics depend on said identification of a shader module which emitted the ray and further depend on properties of the emitted rays, the properties of a ray including one or more of: a type of that ray, a result of intersection testing of that ray, and a relative spatial relationship of that ray with respect to the objects in the 3-D scene; and outputting a representation of the 3-D scene rendered from a second perspective, and respective representations of the emitted rays, the ray representations comprising the determined visual characteristics such that the representation of a ray depends on said identification of a shader module which emitted the ray.

2. The machine-implemented method of claim 1, further comprising accepting input through an interface indicative of an update to the second perspective, thereby causing the representation of the 3-D scene to be re-generated for viewing from the updated perspective, and the relative spatial relationships of each emitted ray to be depicted according to the updated second perspective.

3. The machine-implemented method of claim 1, wherein the outputting of the representation of the 3-D scene comprises displaying each object in the 3-D scene and each light in the 3-D scene in a respective color selected to be visibly distinguishable from surrounding objects.

4. The machine-implemented method of claim 1, wherein some of the rays are occlusion test rays, having been emitted to test whether a surface area of an object is occluded from light emitted from a particular light, and wherein visual characteristics of occlusion test rays include visual characteristics that distinguish between occlusion rays that detected occlusion and rays that failed to detect occlusion during intersection testing.

5. The machine-implemented method of claim 1, further comprising varying the visual characteristics of a ray along its path in portions where an object in the 3-D scene is disposed on the path of that ray.

6. The machine-implemented method of claim 1, further comprising varying the visual characteristics of rays to distinguish between occlusion rays that detected occlusion and occlusion rays that failed to detect occlusion during intersection testing.

7. The machine-implemented method of claim 1, further comprising varying the visual characteristics of a ray according to a direction of the ray.

8. The machine-implemented method of claim 1, further comprising varying the visual characteristics of a ray according to whether the ray hit an object or missed all objects.

9. The machine-implemented method of claim 1, further comprising accepting through an interface an input indicative of selection of an object in the 3-D scene, and responsively changing a visual depiction of the selected object and displaying statistics about the selected object, including a number of primitives composing the object.

10. The machine-implemented method of claim 1, wherein a shader module is executed when an object is intersected by a ray, resulting in the emission of one or more rays, wherein another shader module is executed when one of the emitted rays intersects another object.

11. The machine-implemented method of claim 1, further comprising recording intermediate state of the rendering system during generation of the outputs for use in the debug of the ray tracing renderer, said intermediate state including definitional information for rays emitted, wherein respective definitional information comprising a path for the ray through the 3-D scene, and data concerning execution of one or more of the shader modules for the ray.

12. The machine-implemented method of claim 1 further comprising storing the determined information for the emitted rays in a store for debug status information.

13. The machine-implemented method of claim 1 wherein a stepped execution of the shader modules is implemented such that a user can observe the rendering progress in conjunction with identifications of executing shader modules.

14. A non-transitory machine readable medium storing machine readable code that when processed causes at least one processor to implement a method for producing renderings from 3-D graphics data, the method comprising:
rendering a 2-D image of a 3-D scene into a first frame buffer using a plurality of shader modules, wherein at least one of the shader modules is arranged to emit one or more rays for intersection testing in the 3-D scene, the 2-D image comprising a grid of pixels, the 3-D scene defined by definitional components comprising geometry, and textures defining surfaces for the objects;
displaying the pixels from the first frame buffer in a first window on a display;
displaying a cursor position indicative of a current cursor location on the 2-D image;
determining a set of pixels from the first frame buffer to be further examined;
defining a viewport for a second frame buffer as one or more of the pixels of the set of pixels to be examined;
rendering the viewport;
storing information about rays emitted from shader modules; and
during the rendering of the viewport into the second frame buffer, displaying visual depictions of information including:
shader debugging information relating to at least one of the shader modules, and
at least one of (i) definitional information for at least one ray emitted during the rendering, (ii) dependency information for at least one emitted ray, (iii) results of intersection testing for at least one ray, and (iv) spatial positions of one or more rays;
wherein the visual depiction for a particular ray depends on an identity of a shader module which emitted that particular ray.

15. The machine readable medium of claim 14, wherein the information is recorded, said displaying comprising at least one of (i) visualizing information that is stored on a storage medium, (ii) visualizing information transmitted over a network, and (iii) visualizing information using a process separate from said rendering.

16. The machine readable medium of claim 14, further comprising providing an interface to accept a selection of pixels, determining the set of pixels to be examined according to the accepted selection of pixels, and responsively updating the viewport and re-rendering the viewport.

17. The machine readable medium of claim 14, further comprising determining the set of pixels by identifying pixels from the frame buffer that meet a criteria.

18. The machine readable medium of claim 17, wherein performing the determining of the set of pixels comprises determining the set of pixels according to a region of the frame buffer selected through an interface.

19. A machine-implemented method of assisting in the debug of a ray tracing renderer that comprises a plurality of shader modules, the method comprising:
configuring a rendering system to generate a 2-D grid of pixels from a 3-D scene description, the configuring comprising accessing a 3-D scene description comprising geometry representative of objects in the 3-D scene, wherein the shader modules determine effects of intersections between rays and objects in the 3-D scene in order to generate a 2-D grid of pixels from the 3-D scene viewed from a first perspective;
determining a portion of the 2-D grid of pixels;

causing the rendering system to generate outputs for the determined portion of the 2-D grid;

recording intermediate state of the rendering system during generation of the outputs for use in the debug of the ray tracing renderer, said intermediate state including definitional information for rays emitted, wherein respective definitional information comprising a path for the ray through the 3-D scene and data concerning execution of one or more of the shader modules for the ray; and outputting a representation of the 3-D scene rendered from a second perspective, and respective representations of the rays emitted, each ray representation comprising one or more visual characteristics determined according to: (i) a type of that ray, (ii) a result of intersection testing of that ray, (iii) relative spatial relationship of that ray with respect to the objects in the 3-D scene, as viewed from the second perspective, and (iv) an identity of a shader module which emitted that ray.

20. The machine-implemented method of claim 19 wherein the method is used to debug a multi-pass program.

* * * * *